(12) United States Patent
Song

(10) Patent No.: US 11,731,602 B2
(45) Date of Patent: Aug. 22, 2023

(54) CHECK VALVE FOR BRAKE SYSTEM

(71) Applicant: HL MANDO CORPORATION, Pyeongtaek-si (KR)

(72) Inventor: Min Geun Song, Daejeon (KR)

(73) Assignee: HL MANDO CORPORATION, Pyeongtaek-si (KR)

( * ) Notice: Subject to any disclaimer, the term of this patent is extended or adjusted under 35 U.S.C. 154(b) by 0 days.

(21) Appl. No.: 17/599,908

(22) PCT Filed: Mar. 27, 2020

(86) PCT No.: PCT/KR2020/004212
§ 371 (c)(1),
(2) Date: Sep. 29, 2021

(87) PCT Pub. No.: WO2020/204490
PCT Pub. Date: Oct. 8, 2020

(65) Prior Publication Data
US 2022/0194346 A1 Jun. 23, 2022

(30) Foreign Application Priority Data
Mar. 29, 2019 (KR) .................. 10-2019-0037117

(51) Int. Cl.
*F16K 15/04* (2006.01)
*B60T 15/36* (2006.01)
*F16K 15/18* (2006.01)

(52) U.S. Cl.
CPC ............ *B60T 15/36* (2013.01); *F16K 15/044* (2013.01); *F16K 15/1823* (2021.08)

(58) Field of Classification Search
CPC .... F16K 15/044; F16K 15/063; F16K 15/067; F16K 15/182; F16K 15/1823; B60T 15/36; Y10T 137/785; Y10T 137/7939
See application file for complete search history.

(56) References Cited

U.S. PATENT DOCUMENTS

| 4,112,959 A | * | 9/1978 | Jaekel | ................... F16K 15/044 |
| | | | | 137/539.5 |
| 5,161,572 A | * | 11/1992 | Oberl | ....................... F01M 1/16 |
| | | | | 137/516.27 |

(Continued)

FOREIGN PATENT DOCUMENTS

| JP | 2000-203408 A | 7/2000 |
| JP | 2012-211654 A | 11/2012 |

(Continued)

OTHER PUBLICATIONS

Machine Translation of JP 2012211654.*

(Continued)

*Primary Examiner* — Kevin F Murphy
(74) *Attorney, Agent, or Firm* — Hauptman Ham, LLP

(57) ABSTRACT

Disclosed herein a check valve for a brake system includes a valve seat configured to be form an oil passage thereinside; an opening/closing member configured to open and close the oil passage inside the valve seat; an elastic member having one end elastically supporting the opening/closing member; a valve housing configured to support the other end of the elastic member and coupled to the valve seat; and a plunger that is accommodated in the oil passage and flows according to a flow of fluid generated during operation of the brake system.

11 Claims, 5 Drawing Sheets

(56) References Cited

U.S. PATENT DOCUMENTS

| | | | | |
|---|---|---|---|---|
| 5,462,413 A | * | 10/1995 | Schroeder | F04B 49/24 |
| | | | | 417/310 |
| 8,322,371 B2 | * | 12/2012 | Strobel | F16K 47/08 |
| | | | | 137/550 |

FOREIGN PATENT DOCUMENTS

| | | |
|---|---|---|
| JP | 5304446 B2 | 10/2013 |
| KR | 10-1992-0007026 B1 | 8/1992 |
| KR | 10-2018-0128189 A | 12/2018 |

OTHER PUBLICATIONS

International Search Report dated Jul. 15, 2020, corresponding to International Application No. PCT/KR2020/004212.
Written Opinion issued for corresponding International Patent Application No. PCT/JP2020/004212 dated Jul. 15, 2020.
Office Action dated Mar. 20, 2023, for corresponding Korean Patent Application No. 10-2019-0037117, along with an English machine translation (14 pages).

* cited by examiner

CHECK VALVE FOR BRAKE SYSTEM

CROSS-REFERENCE TO RELATED APPLICATION

The present application is a national stage filing under 35 U.S.C § 371 of PCT application number PCT/KR2020/004212 filed on Mar. 27, 2020, which is based upon and claims the benefit of priorities to Korean Patent Application No. 10-2019-0037117 filed on Mar. 29, 2019, in the Korean Intellectual Property Office. All of the aforementioned applications are hereby incorporated by reference in their entireties.

TECHNICAL FIELD

The disclosure relates to a check valve for a brake system, and more particularly, to a check valve for a brake system capable of reducing noise generated during a valve operation.

BACKGROUND ART

Vehicles are essentially equipped with a brake system for performing braking, and various types of brake systems have been proposed for the safety of drivers and passengers.

Brake systems may include, for example, as an anti-lock brake system (ABS) that prevents a wheel slippage during braking, a brake traction control system (BTCS) that prevents a slipping of a driving wheel during sudden unintended acceleration or sudden acceleration of a vehicle, a vehicle dynamic control system (VDC) that maintains a traveling condition of a vehicle stably by controlling brake fluid pressure by the combination of the ABS and the BTCS.

Such a brake system may include a plurality of solenoid valves for controlling braking hydraulic pressure delivered to a hydraulic brake side mounted on wheels of a vehicle, low and high pressure accumulators for temporarily storing oil flowing out from the hydraulic brake, a motor and a pump for pumping forcibly oil from the low pressure accumulator, a plurality of check valves to prevent a reverse flow of oil, and an electronic control unit (ECU) for controlling operation of the solenoid valves and the motor, and these components are compactly installed in a hydraulic block made of aluminum.

As an example of a check valve used in a conventional brake system, the check valve provided in a flow path between a suction side of a pump and a low pressure accumulator blocks oil from the master cylinder side from being delivered to the low pressure accumulator side, and at the same time, prevents oil from wheel cylinders side from flowing into the suction side of the pump when the pump is driven by the motor.

Conventional check valves may include a valve housing and a valve seat that have oil passage therein and press-fitted to a hydraulic block in which oil flow paths are formed, a ball for selectively opening and closing the oil passage inside the combined valve housing and valve seat, and a spring for supporting elastically.

However, the ball that opens and closes the oil passage while being elastically supported by the spring during operation of the check valve may be in an unstable state according to the flow of fluid to occur vibration, so that the vibration causes cavitation noise.

DISCLOSURE

Technical Problem

The disclosure provides a check valve of a brake system according to an embodiment of a disclosure capable of reducing fluid noise generated during operation.

Technical Solution

In accordance with an aspect of the disclosure, a check valve for a brake system includes a valve seat configured to be form an oil passage thereinside; an opening/closing member configured to open and close the oil passage inside the valve seat; an elastic member having one end elastically supporting the opening/closing member; a valve housing configured to support the other end of the elastic member and coupled to the valve seat; and a plunger that is accommodated in the oil passage and flows according to a flow of fluid generated during operation of the brake system.

The oil passage may include a first oil passage that forms an inlet which fluid flows in and a second oil passage that forms an outlet which fluid flows out, and the plunger is provided on an upstream side of the second oil passage.

The second oil passage may further include a neck passage narrower than the second oil passage between the first oil passage and the second oil passage, and opposite ends of the plunger is restrained by the neck passage and the opening/closing member.

A length of the plunger may be at least smaller than or equal to a length of the neck passage.

The plunger may be provided to flow in a vertical direction of the oil passage.

The plunger may be provided in the form of a polyhedral prism.

The plunger may be provided in the form of a triangular prism having a triangular horizontal cross-section.

In accordance with another aspect of the disclosure, a check valve for a brake system includes a valve seat configured to be form an oil passage thereinside; an opening/closing member configured to open and close the oil passage inside the valve seat; an elastic member having one end elastically supporting the opening/closing member; a valve housing configured to support the other end of the elastic member and coupled to the valve seat; and a plunger configured to be flowably accommodated in the oil passage, and when a flow of fluid occurs reducing a stroke of the opening/closing member by being in contact with the opening/closing member after rising to prevent the opening/closing member from descending.

At least a part of the plunger may be accommodated in the oil passage when the plunger is in contact with the opening/closing member according to the flow of fluid, The plunger may be provided to flow in a vertical direction of the oil passage.

The plunger may be provided in the form of a polyhedral prism.

The oil passage may include a first oil passage that forms an inlet which fluid flows in and a second oil passage that forms an outlet which fluid flows out, and the plunger is provided on an upstream side of the second oil passage.

The second oil passage may further include a neck passage narrower than the second oil passage between the first oil passage and the second oil passage, and opposite ends of the plunger is restrained by the neck passage and the opening/closing member.

A length of the plunger may be at least smaller than or equal to a length of the neck passage.

The plunger may be provided in the form of a triangular prism.

Advantageous Effects

The embodiment of the disclosure may provide the check valve of the brake system including the plunger that flows in the oil passage inside the valve seat provided on the upstream side of the opening/closing member. Accordingly, the plunger that moves according to the flow of fluid when the brake system is operated, is in contact with the opening/closing member, such as a ball, to reduce the stroke which the ball moves, resulting in effectively reducing the operation noise of the check valve generated thereby.

MODES OF THE DISCLOSURE

Hereinafter, the embodiments of the disclosure will be described in detail with reference to accompanying drawings. It should be understood that the terms used in the specification and the appended claims should not be construed as limited to general and dictionary meanings, but interpreted based on the meanings and concepts corresponding to technical aspects of the disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the spirit and scope of the disclosure.

First, before describing a check valve of a brake system according to an embodiment of the disclosure, a brake system in which the check valve of the disclosure is used will be briefly described.

Figure 1:
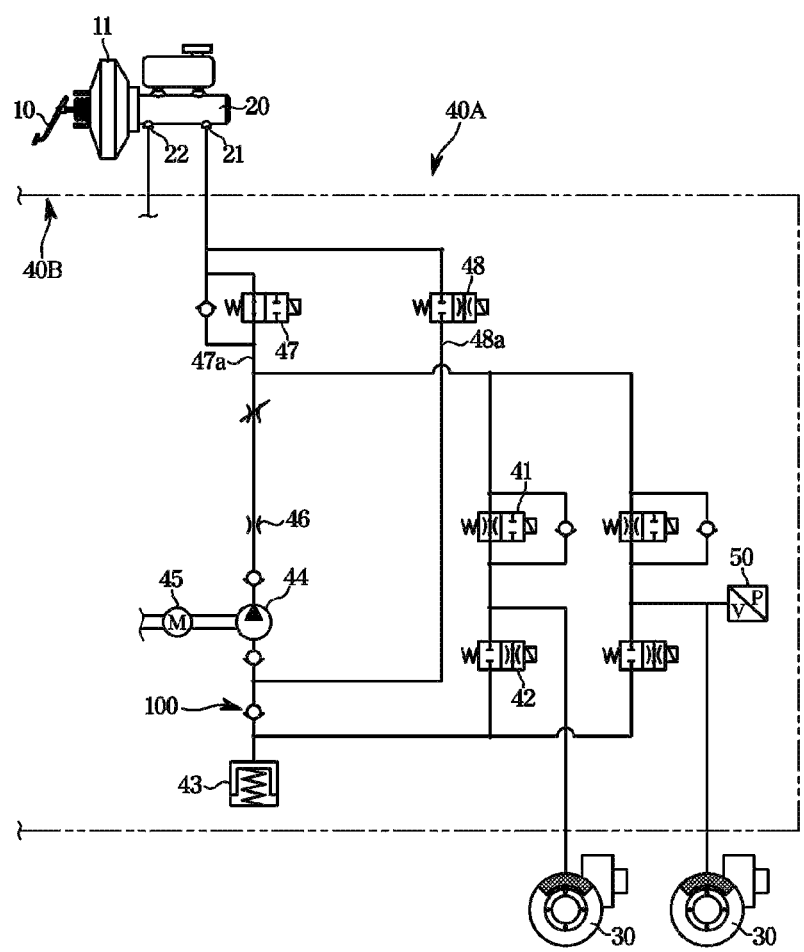
FIG. 1 is a diagram illustrating a brake system provided with a check valve of a brake system according to an embodiment of the disclosure.

FIG. 1 is a view illustrating a conventional electronic brake system. The electronic brake system includes a brake pedal 10 that receives a driver's operating force, a brake booster 11 that doubles a pedal effort of the brake pedal by using the pressure difference between vacuum pressure and atmospheric pressure in response to the pedal effort of the brake pedal 10, a master cylinder 20 that generates pressure by the brake booster 11, a first hydraulic circuit 40A that controls hydraulic pressure transmission by connecting a first port 21 of the master cylinder 20 and two wheel brakes (or wheel cylinders), and a second hydraulic circuit 40B that controls hydraulic pressure transmission by connecting a second port 22 of the master cylinder 20 and the remaining two wheel brakes 30. The first hydraulic circuit 40A and the second hydraulic circuit 40B are compactly installed in a hydraulic block (not shown).

Each of the first and second hydraulic circuits 40A and 40B may include solenoid valves 41 and 42 for controlling brake hydraulic pressure transmitted to the two wheel brakes 30 side, respectively, a pump 44 for sucking and pumping oil from the master cylinder 20 or oil flowing out from the wheel brakes side, a low pressure accumulator 43 for temporarily storing oil exiting from the wheel brakes 30, an orifice 46 for reducing pressure pulsation from hydraulic pressure of the pumped pump, and an auxiliary flow path 48 for guiding the oil of the master cylinder 20 to be sucked into an inlet of the pump 44 in a traction control system (TCS) mode.

A plurality of solenoid valves 41 and 42 are connected to the upstream and downstream sides of the wheel brakes 30, and include a normal open type solenoid valve 41 that is arranged on an upstream side of each wheel brake 30 and normally maintained in an open state, and a normal closed type solenoid valve 42 that is arranged on a downstream side of each wheel brake 30 and normally maintained in a closed state. The opening and closing operations of the solenoid valves 41 and 42 are controlled by an ECU (not shown) that detects a vehicle speed through a wheel speed sensor disposed on each wheel side. When the normal closed solenoid valve 42 is opened according to decompression braking, the oil flowing out from the wheel brake 30 side is temporarily stored in the low pressure accumulator 43.

The pump 44 is driven by the motor 45 to suck in the oil stored in the low pressure accumulator 43 and discharge the oil to the orifice 46 side, thereby transmitting hydraulic pressure to the wheel brake 30 side or the master cylinder 20 side.

Furthermore, a normal open type solenoid valve 47 (hereinafter referred to as a TC valve) for the TCS is installed in a main flow path 47a connecting the master cylinder 20 and an outlet of the pump 44. The TC valve 47 normally maintains an open state, so that during general (or service) braking through the brake pedal 10, the brake hydraulic pressure formed in the master cylinder 20 may be transmitted to the wheel brake 30 side through the main flow path 47a.

Furthermore, an auxiliary flow path 48a is branched from the main flow path 47a and guides the oil of the master cylinder 20 to be sucked toward the inlet side of the pump 44. A shuttle valve 48 is provided in the auxiliary flow path to allow oil to flows only to the inlet of the pump 44. The electrically operated shuttle valve 48 is installed in the middle of the auxiliary flow path 48a and is normally closed and operates to be opened in the TCS mode.

Furthermore, a pressure sensor (not shown) for detecting vacuum pressure and atmospheric pressure of the brake booster 11 is installed in the brake booster 11, and a wheel pressure sensor 50 for detecting an actual braking pressure applied to a left front FL and a right front FR wheels and a left rear RL and a right rear RR wheels is also installed in the brake booster 11. The pressure sensors are electrically connected to the ECU and controlled.

The braking operation of the electronic brake system according to the embodiment configured as described above is as follows.

First, the driver depresses the brake pedal 10 to decelerate the speed or maintain the stopped state while a vehicle is traveling or stopped. Accordingly, in the brake booster 11, a boosting force that is amplified more than the input is formed, and a considerable amount of braking hydraulic pressure is generated in the master cylinder 20 through the boosting force. The generated braking hydraulic pressure is transmitted to the FR and FL wheels and the RR and RL wheels through the solenoid valves 41 to perform braking operation. Furthermore, when the driver takes his or her foot off the brake pedal 10 little by little or completely, the pressure of oil in each wheel brake is returned to the master cylinder 20 and a reservoir again through the solenoid valves 41 and 42, thereby reducing the braking force or completely releasing the braking operation.

Figure 2:
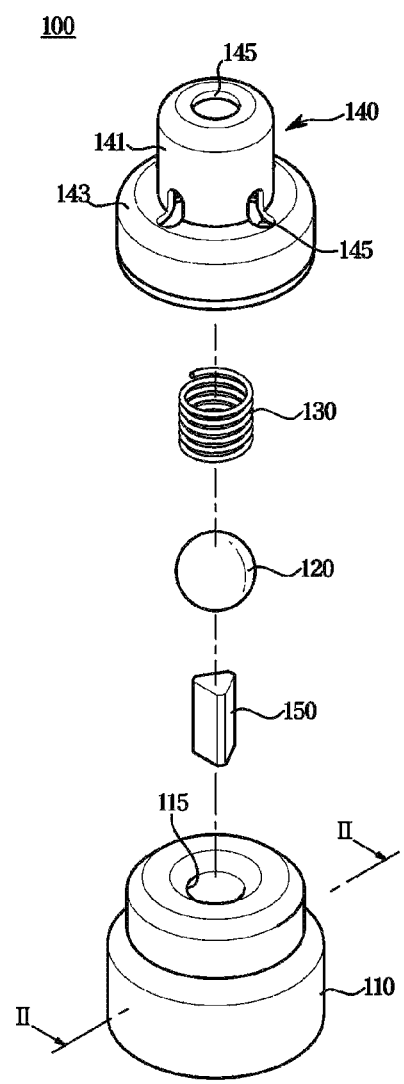
FIG. 2 is an exploded view illustrating the check valve of the brake system according to the embodiment of the disclosure.
Figure 3:
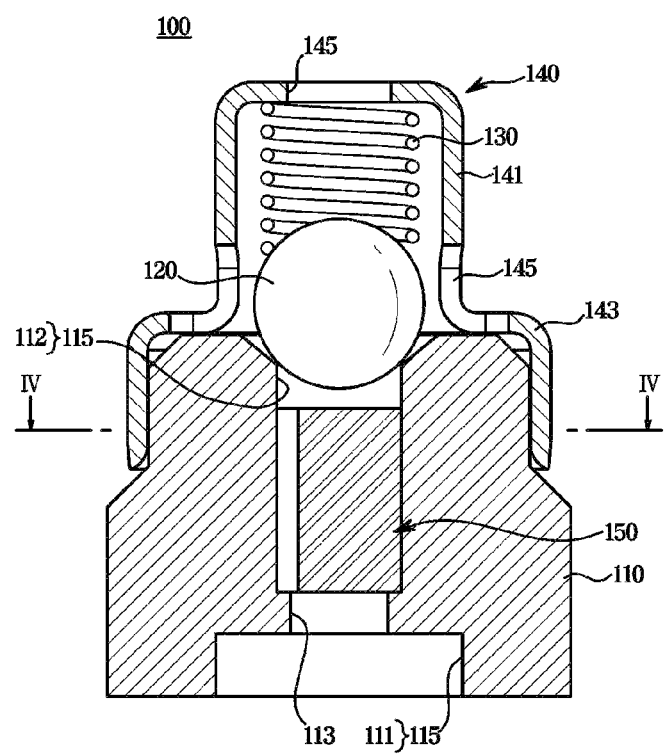
FIG. 3 is a vertical cross-sectional view illustrating the check valve of the brake system according to the embodiment of the disclosure.

FIG. 2 is a perspective view illustrating a check valve of a brake system according to the embodiment of the disclosure, and FIG. 3 is an assembled cross-sectional view of the check valve. A check valve 100 of the embodiment is installed on a suction side of flow path of the low pressure accumulator 43 and the pump 44 in FIG. 1, but the disclosure is not limited thereto and may be installed on others oil flow path.

As shown the drawings, the check valve 100 of the embodiment may include a valve seat 110 that is press-fitted to a hydraulic block (not shown) and forms an oil passage 115 therein, an opening/closing member 120 for opening and closing the oil passage 115 of the valve seat 110, an elastic member 130 for elastically supporting the opening/closing member 120, a valve housing 140 for supporting the elastic member 130 and assembled with the valve seat 110, and a plunger 150 flowing in the oil passage 115.

The valve seat 110 is made of a metal material, and the oil passage 115 is passed through the center thereof in a longitudinal direction, and has a cylindrical shape outside surface so that the valve housing 140 may be easily coupled, while a step is formed the outside surface thereof so that the valve housing 140 may be press-fitted. The valve seat 110 may be manufactured at low cost, such as by pressing or forging, because the shape thereof is simplified compared to the prior art.

The hollow oil passage 115 of the valve seat 110 may include a first oil passage 111 forming an inlet through which fluid flows in and a second oil passage 112 forming an outlet through which the fluid flows out. The first oil passage 111 is connected to an oil flow path (not shown) formed in the hydraulic block, and the second oil passage 112 may include an enlarged inclined valve surface on end thereof so that a ball 120 as the opening and closing member for selectively opening and closing the oil passage 115 is stably supported.

The opening/closing member 120 may have, for example, a ball shape, and may open and close the second oil passage 112, specifically, the oil passage 115 while selectively contacting the valve surface, and the elastic member 130 may be provided in the form of a spring, and one end thereof is supported by the valve housing 140 to elastically press the opening/closing member 120 toward the oil passage 115 side of the valve seat 110.

As shown in the drawings, the valve housing 140 may be provided with a hat shape in a cross-section. For example, the valve housing 140 may have a small diameter portion 141 and a large diameter portion 143 by a molding process such as pressure pressing. The small diameter portion 141 provided at a center thereof may support the spring 130 in an elastic direction while also supporting the spring from a side thereof so as not to buckle, and the large diameter portion 143 may be press-fitted to an outside surface of the valve seat 110 through the open end thereof. Furthermore, a plurality of oil holes may be provided in the valve housing 140. For example, the plurality of oil holes 145 may be provided dispersedly in the center of the small diameter portion 141 and at a stepped corner between the small diameter portion 141 and the large diameter portion 143.

The plunger 150 is provided to be flowably accommodated in the oil passage 115 of the valve seat 110. Specifically, the plunger 150 is provided on an upstream side (in front) of the opening/closing member 120 based on the flow of fluid (oil) generated during the operation of the brake system, and at this time, a neck passage 113 may be provided between the first oil passage 111 and the second oil passage 112 so that the plunger 150 may be restrained inside the check valve 100. In other words, opposite ends of the plunger 150 are restrained by the neck passage 113 narrower than the second oil passage 112 and the opening/closing member 120 opposite to the neck passage 113, respectively, thereby being easily assembled when the check valve 100 is manufactured.

The plunger 150 is provided to flow the second oil passage 112 along the flow of fluid during the operation of the brake system. For example, in the case of the plunger being provided to flow vertically in a longitudinal direction of the second oil passage 112, the plunger 150 may operate quickly according to flow of fluid.

Figure 4:
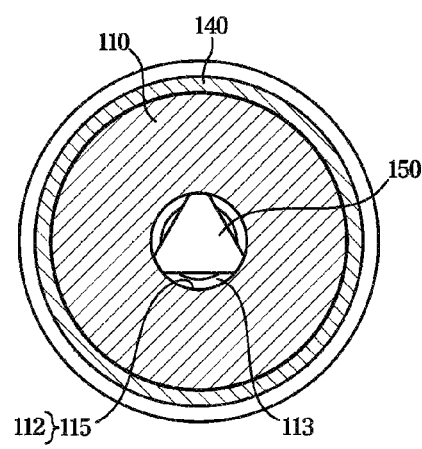
FIG. 4 is a horizontal cross-sectional view illustrating the check valve of the brake system according to the embodiment of the disclosure.

To this end, the plunger 150 according to the embodiment may have a triangular prism shape as shown in FIG. 2, and further may have a triangular shape when viewed in a horizontal cross-section as shown in FIG. 4.

Referring to FIG. 4, the plunger 150 having the triangular cross-sectional shape is provided with rounded corners to smoothly ascend and descend along a fluid flow direction of the second oil passage 112, and the fluid may pass through the oil passage 115 through an empty space between the three surfaces of the plunger 150 and an inner circumferential surface of the second oil passage 112, which are in contact with each other. Because the plunger 150 having the triangular prism shape has a large amount of the fluid flow and is easier to flow up and down than the left and right flow (or rotation), thereby suppressing the operation noise of the check valve more effectively.

Figure 5:
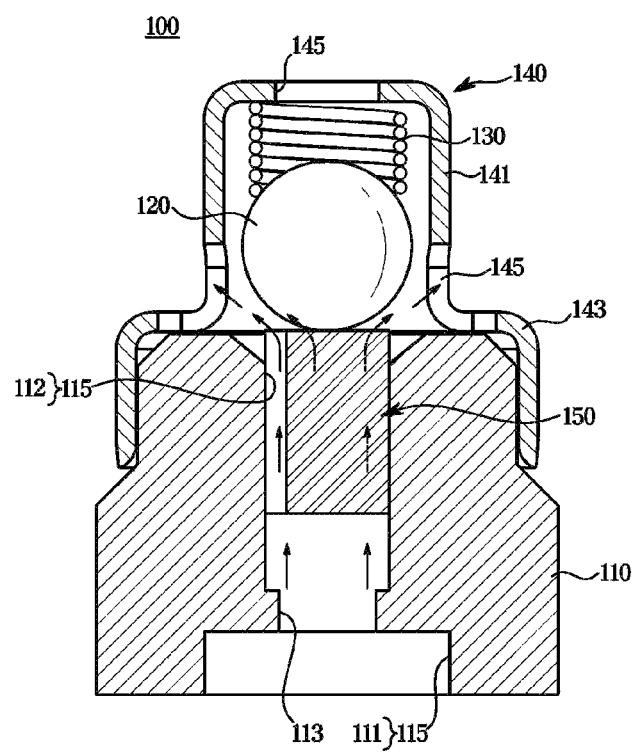
FIG. 5 is a vertical cross-sectional view illustrating an operation of the check valve of the brake system according to the embodiment of the disclosure.

FIG. 5 is a view illustrating the flow of fluid generated when the brake system is operated with arrows. As shown in FIG. 5, when the fluid moves, the plunger 150 rises and comes into contact with the opening/closing member 120. And, the plunger 150 rises the opening/closing member to maintain an open state while pressing and supporting the opening/closing member 120 by hydraulic pressure so that the opening/closing member 120 does not close until a certain flow rate passes. The noise of the check valve generated during the operation of the brake system is caused by a stroke of the opening/closing member moving up and down. The check valve according to the embodiment prevents the opening/closing member 120 from descending until the plunger 150 is in contact with the opening/closing member 120 and a predetermined flow rate passes during the fluid movement. As a result, the plunger 150 may effectively suppress noise generation by reducing the behavior of the opening/closing member 120, that is, the stroke of the ball.

On the other hand, when one end of the plunger 150 and the opening/closing member 120 are in contact, at least a part of the other end of the plunger 150 must be accommodated in the second oil passage 112. In other words, because the plunger 150 should not be deviated from the second oil passage 112 by hydraulic pressure during operation, opposite ends of the plunger are in contact with the inner circumferential surface of the second oil passage 112 and the opening/closing member 120, respectively, as described above, thereby maintaining vertical behavior stably.

Furthermore, a length of the plunger 150 may be at least smaller than or equal to the length in a vertical direction of the second oil passage 112. This is because, due to manufacturing tolerances, etc., if the length of the plunger 150 is longer than that of the second oil passage 112, the opening/closing member 120 may not be able to close the second oil passage 112 at the closed position. Accordingly, it is preferable that the length of the plunger 150 is at least smaller than the length between the neck passage 113 and a valve surface of the second oil passage 112.

In the above embodiment, the shape of the plunger 150 has been exemplified as the triangular prism shape, but the disclosure is not limited thereto. For example, the plunger 150 may be a polyhedral prism having corners on the sides, such as a quadrangular prism, a pentagonal prism, etc., in the longitudinal direction of the second oil passage 112, that is, to facilitate moving vertically. Furthermore, the plunger may have a bottom surface that is in contact with the fluid such as a flat, a conical, and a round, etc. Furthermore, the plunger 150 may be changed and modified in various shapes such as a semicircle, an ellipse, and a notch circle on the side thereof facing the inner circumferential surface of the oil passage as long as noise is not caused by shaking or fluctuating while moving vertically inside the second oil passage 112.

While the disclosure has been shown and described with reference to certain exemplary embodiments thereof, it will be understood by those skilled in the art that various changes in form and details may be made therein without departing from the spirit and scope of the disclosure as defined by the appended claims.

The invention claimed is:

1. A check valve for a brake system, comprising:
a valve seat configured to form an oil passage thereinside;
an opening/closing member configured to open and close the oil passage inside the valve seat;
an elastic member having one end elastically supporting the opening/closing member;
a valve housing configured to support the other end of the elastic member and coupled to the valve seat; and
a plunger that is accommodated in the oil passage and flows according to a flow of fluid generated during operation of the brake system,
wherein
the oil passage comprises
a first oil passage that forms an inlet which fluid flows in,
a second oil passage that forms an outlet which fluid flows out, the plunger being provided on an upstream side of the second oil passage, and
a neck passage between the first oil passage and the second oil passage, the neck passage being narrower than the second oil passage,
first and second opposite ends of the plunger are restrained by the neck passage and the opening/closing member, respectively, and
the oil passage includes an empty space between an outer surface of the plunger and an inner surface of the second oil passage, and the empty space is open.

2. The check valve of claim 1, wherein
a length of the plunger is smaller than or equal to a length of the second oil passage.

3. The check valve of claim 1, wherein
the plunger is configured to flow in a vertical direction of the oil passage.

4. The check valve of claim 1, wherein
the plunger is provided in a form of a polyhedral prism.

5. The check valve of claim 4, wherein
the plunger is provided in a form of a triangular prism having a triangular horizontal cross-section.

6. A check valve for a brake system, comprising:
a valve seat configured to form an oil passage thereinside;
an opening/closing member configured to open and close the oil passage inside the valve seat;
an elastic member having one end elastically supporting the opening/closing member;
a valve housing configured to support the other end of the elastic member and coupled to the valve seat; and
a plunger configured to be flowably accommodated in the oil passage and to rise when a flow of fluid occurs, to prevent the opening/closing member from descending while in contact with the opening/closing member for reducing a stroke of the opening/closing member,
wherein
the oil passage comprises
a first oil passage that forms an inlet which fluid flows in,
a second oil passage that forms an outlet which fluid flows out, the plunger being provided on an upstream side of the second oil passage, and
a neck passage between the first oil passage and the second oil passage, the neck passage being narrower than the second oil passage,
first and second opposite ends of the plunger are restrained by the neck passage and the opening/closing member, respectively, and
the oil passage includes an empty space between an outer surface of the plunger and an inner surface of the second oil passage, and the empty space is open.

7. The check valve of claim 6, wherein
when the plunger is in contact with the opening/closing member according to the flow of fluid, at least a part of the plunger is accommodated in the oil passage.

8. The check valve of claim 6, wherein
the plunger is configured to flow in a vertical direction of the oil passage.

9. The check valve of claim 8, wherein
the plunger is provided in a form of a polyhedral prism.

10. The check valve of claim 6, wherein
a length of the plunger is smaller than or equal to a length of the second oil passage.

11. The check valve of claim 6, wherein
the plunger is provided in a form of a triangular prism.

* * * * *